May 19, 1970 J. D. HAYS ET AL 3,512,704
MOVEMENT VERIFICATION SYSTEM
Filed Aug. 29, 1968 3 Sheets-Sheet 1

INVENTORS
JOHN D. HAYS,
BERNARD J. HAUSFELD &
ZEBULON V. SCARBOROUGH

THEIR ATTORNEYS

May 19, 1970    J. D. HAYS ET AL    3,512,704
MOVEMENT VERIFICATION SYSTEM
Filed Aug. 29, 1968    3 Sheets-Sheet 3

INVENTORS
JOHN D. HAYS,
BERNARD J. HAUSFELD &
ZEBULON V. SCARBOROUGH

BY  *Louis A. Kline*
    *John J. Callahan*
    THEIR ATTORNEYS

United States Patent Office

3,512,704
Patented May 19, 1970

3,512,704
MOVEMENT VERIFICATION SYSTEM
John D. Hays, Troy, and Bernard J. Hausfeld and
Zebulon V. Scarborough, Dayton, Ohio, assignors
to The National Cash Register Company, Dayton,
Ohio, a corporation of Maryland
Filed Aug. 29, 1968, Ser. No. 756,241
Int. Cl. G06k 5/02
U.S. Cl. 234—33                            15 Claims

ABSTRACT OF THE DISCLOSURE

An improved system for verifying the occurrence of consummated movement in machine members which may be driven by impact or non-positive displacement is disclosed. Alternate detector embodiments each responsive to changes in two properties of a sensing coil are disclosed; the system develops output signals indicative of machine movement and instantaneous machine position. A high-efficiency excitation source for driving multiple sensing coils and a means of signal transmission with high noise immunity are disclosed for one detector embodiment.

CROSS-REFERENCE TO RELATED APPLICATIONS

The present verification and sensing system is employable with the media-perforating mechanism disclosed in United States patent application Ser. No. 663,159, filed Aug. 24, 1967, in the names of John D. Hays and Robert E. Vance and assigned to the same assignee as the present invention.

BACKGROUND OF THE INVENTION

Field of the invention

The present invention relates to an electromagnetic movement transducer system employing an undulating or pulsed energy source for the excitation thereof. The system operates upon the principle of sensing change in a plurality of electrical properties of a sensing coil when the coil's magnetic field is influenced by external members.

Description of the prior art

Several classes of motion-sensing and -verifying devices are revealed in the prior art. The most significant of these devices may be identified and distinguished from the present invention as follows:

U.S. Pat. No. 3,159,337, issued on Dec. 1, 1964, on the application of John H. MacNeill et al., discloses a sensor for use in a paper tape punch. The MacNeill et al. sensor employs a permanent magnetic member and produces an output signal only when the punching member is in motion. The MacNeill sensor does not provide a static indication of moving member position; it does not employ resonance or any other means for detecting the sensing coil loss component that is important in the present invention.

U.S. Pat. No. 3,245,615, issued on Apr. 12, 1966, on the application of Hans Heymann, discloses a motion sensor system for use in a media-punching machine, such as a paper tape punch. In the Heymann sensor, a permanent magnet mounted on the moving machine member is used to change the magnetic state of a ferrite core member. Because of the non-linear properties of the ferrite core, the Heyman sensor is useful only in providing a Yes-No indication of punch motion. The hysteresis properties of the ferrite core in the Heymann patent make the unaided system itself incapable of detecting departure of the moving member from the sensed position of its motion; a special sequence of reset and interrogate pulses is required to overcome this limitation. In summary, the ferrite core, the permanent magnet, and the readout or detector circuit of the Heymann system contrast with the structure of the present invention.

U.S. Patent No. 2,609,433, issued on Sept. 2, 1952, on the application of Harold W. Goff, discloses a movement sensor system for use with a media-punching system. The Goff system causes one or more movable members to be displaced into the magnetic field of a coil, so as to change the inductance of the coil and change the phase relation between current and voltage of a signal impressed across the coil. The Goff sensor specifies use of an A.C. bridge circuit in an inductance-measuring configuration but does not utilize electrical losses in the sensing coil to distinguish between displaced and non-displaced positions of the movable member. The Goff bridge circuit is coupled to a vacuum tube and an electromechanical relay. If the Goff sensing system is employed where multiple moving members are to be sensed in a machine, only one sensing coil is utilized, in contrast with the multiple sensing coils of the present invention; the Goff system attempts to distinguish the number of mechanical members displaced into the sensing coil, there being a different system output for one and for more than one displaced member. The Goff system would have difficulty in distinguishing the difference between one fully displaced member and two partly displaced members.

The structural distinctions of incorporating a bridge circuit measuring only inductance, a vacuum tube, and a single large sensing coil distinguish the Goff system from the present invention.

U.S. Pat. No. 2,293,708, issued on Aug. 25, 1942, on the application of Andrew L. Brown, discloses a motion-verifying system applied to a telegraph printer mechanism. Brown's invention employs a mechanically driven capacitor to vary the resonant frequency of a vacuum tube oscillator circuit. The Brown system does not recognize loss changes in the resonant circuit. The Brown system does not provide structural embodiments of a sensing coil or a detector means capable of providing analog output signal.

SUMMARY OF THE INVENTION

Intermittent mechanisms having a multiplicity of rapidly moving parts are increasingly common in modern equipment; steadily increasing ability to assimilate mechanism control data at rapid rates creates a continuing need for mechanisms to operate at a faster rate.

As operating rates increase with intermittent mechanisms, the use of inertia drive, impact energy transfer, ballistic moving members, and other non-positive displacement systems is desirable. These non-positive displacement systems, together with rapid movement which is beyond direct human sensing ability, give rise to a need for sensing and verifying by electronic methods that movement of the driven machine member has occurred.

Sensing of machine member motion is often desirable in both an operational environment and an engineering or design environment. In an operating machine, some means to evoke human intervention upon the malfunction of a remotely located machine member is a common requirement. In an engineering effort, it is common to require data concerning velocity, acceleration, and distance traveled by a machine member during its operating cycle and during periods of overshoot, bounce, and impact with another machine member.

Peripheral equipment for electronic data-processing systems, textile manufacturing machinery, packaging machinery, and automated manufacturing equipment are typical examples of high-speed machines which have need for motion-sensing and -verifying systems.

Machines which achieve rapid mechanical motion by means of electrical excitation often afford a hostile environment for a sensitive, low-level motion-verifying system; the high rates of energy transfer commonly employed in these machines is inherently conducive to coupling large noise signals into the verifying system. In the computer peripheral equipment field, where fast movements for punching, printing, diverting, and positioning are common, it is possible to observe ready examples of these verification difficulties. The present verification system offers unique immunity to such noise problems in one embodiment.

The present invention relates to a motion-verifying system which is applicable to any of the above types of machinery. It is applicable for sensing either Go, No-Go operation or for sensing, with high resolution, the motion of a machine number, or the relative motion between two machine numbers.

Prior-art systems which are devoted to Go, No-Go applications have found difficulty in distinguishing between the sensed machine member being departed from its home position and being fully extended. In applications these two conditions are synonymous or do not require distinction, these prior-art systems are satisfactory; however, many of the applications suggested above require Go, No-Go indication of fully extended position rather than merely departure from home position.

The present system affords an arrangement which is capable of indicating fully extended position or any desired intermediate position.

The present system operates on an electromagnetic principle but without the use of magnetized machine members. The system employs an undulating current excitation source for a sensing coil operated in the variable inductance, variable Q mode and provides in one embodiment a noise-immune means to transport the sensed signal to a distant detector.

DESCRIPTION OF THE PREFERRED EMBODIMENT

Figure 5:
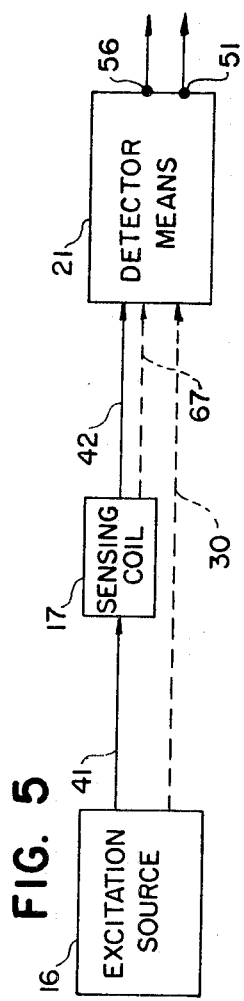
FIG. 5 in the drawings shows a block diagram of the essential elements in the present sensing system.

In FIG. 5 of the drawings, a block diagram of the essential elements of the present system is shown. As disclosed in this figure, the system is composed of three elements—an excitation source 16, a sensing coil 17, and a detector means 21. Leads intercoupling signals between these three elements are shown at 41, 42, 30, and 67. The intercoupling leads 30 and 67 in FIG. 5 are shown dotted, since they are inherent in the grounding of components and optional in some embodiments of the invention respectively.

FIG. 5 is a generic representation of several embodiments which may be employed with the present invention; all of these embodiments are composed of the three elements shown in FIG. 5, although the embodiment within the detector means and the excitation source differs.

Figure 1:
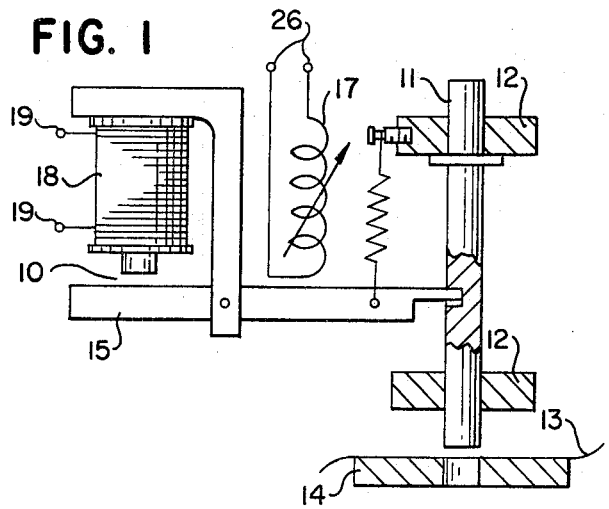
FIG. 1 in the drawings shows a directly activated media-perforating mechanism having a sensing coil according to the present invention associated therewith.

In FIG. 1 of the drawings, a sensing coil 17, having terminals 26 and constituting part of the verification system, is shown incorporated into a paper tape punch. The punch shown in FIG. 1 operates by exciting the solenoid coil 18 at its terminals 19, so that the armature 15 is caused to move closer to the pole piece and thereby close the air gap 10 between the armature and the pole piece. Movement of the armature 15 causes the punching member 11 to be driven through the paper tape medium 13 into the anvil member 14. Guides, shown at 12, restrict the motion of the punching pin to the vertical plane. The mechanism shown in FIG. 1 represents a high-speed direct-acting punch; a punch free of interposers or other mechanical linkage, the mechanism operates with small movements at very high speeds; the air gap 10 measuring 0.015 to 0.030 inch, and the armature movement occurring within a time of two milliseconds, in a practical embodiment of such a punch.

It is obvious that verification of motions so small and occurring at this rate of speed must be accomplished by automatic systems rather than by manual observation. This is especially true in computer applications where the paper tape punch may be located remote from the operator.

The sensing coil 17, located close to the punch mechanism in FIG. 1, comprises the means for introducing punch armature motion into the electronic system of the present invention. The coil is located physically adjacent to the moving armature 15 and is closely magnetically coupled with the movable armature, as indicated by the arrow through the coil 17. Movement of the armature 15 within the field of the sensing coil 17 causes two changes to be reflected in the electrical properties of the sensing coil 17. A movement of the armature 15 away from the sensing coil 17 causes both the coil inductance to be decreased and the magnetically-induced losses in the coil to be decreased. Both of these properties are utilized in the present invention in order that the amount or value of the signal observed from the sensing coil may be enhanced. Without the use of these two changing components of properties of the sensing coil 17, it would be difficult to obtain a usable signal from a sensing coil with the small movement incorporated into a high-speed punch mechanism; some prior-art techniques for movement verification have proven unsatisfactory in a punch environment primarily because of this small signal available from the sensing coil. It is especially notable that a system which is not cognizant of both the inductance change and the loss change in the sensing coil may inadvertently permit these two effects to oppose one another and produce an output which is smaller than either component alone. In a system made according to the present invention, the two signal components are caused to be additive.

To maximize the signal available from the sensing coil 17, it is desirable, in addition to combining the two components of coil change in an additive manner, to tailor the properties of the sensing coil 17 and the armature 15. In order that the electrical loss component of the signal in the sensing coil 17 may be as large as possible, it is desirable for the armature 15 to be a structure which is lossy or inefficient at the frequency selected for exciting the sensing coil 17. Both the selection of the armature member 15 material and the physical construction of the armature member 15 may contribute to this high loss design. In order that the armature 15 may be lossy, it should display large energy absorption when excited magnetically at the operating frequency; both eddy current losses and hysteresis losses are potential contributors to this condition. Large hysteresis and eddy current losses are intentionally avoided in most magnetic designs by making the magnetic member from an alloy such as Hypersil or Permalloy, and by other techniques, such as making the magnetic member laminated rather than solid in form.

The design to be utilized in fabricating the present armature 15 contrasts with these low loss techniques for magnetic member construction. In the present design, it is specifically desired that large energy absorption occur in the armature 15, so that a change in sensing coil 17 losses may be easily detected as the armature 15 moves away from the sensing coil 17.

In practice, it has been found that an armature design which emphasizes eddy current losses through the use of material having high magnetic transmission efficiency embodied in a relatively large solid member affords an easily measurable loss component. It is believed that in this design the magnetically efficient material provides tight magnetic coupling with the sensing coil, while the relatively large and solid, non-laminated configuration provides for high eddy current losses. Cast 2½% silicon iron has been found a suitable material for constructing the high loss armature member 15. The cast 2½% silicon iron has also been found to have properties similar to Number 5 relay steel.

It has also been found that armature members composed of metallic but non-magnetic materials afford signal output from the verification system. Movement of an armature composed of these materials into the close and remote positions adjacent to the sensing coil 17 will change the losses induced into the sensing coil 17 and will also change the inductance of the sensing coil, since the metallic member acts as a shorted turn magnetically coupled to the sensing coil. In contrast to the embodiment which couples a member having permeability higher than air to the sensing coil and thereby increases its inductance, the coupling of a mettalic member acting as a shorted turn to the sensing coil will decrease sensing coil inductance, but will have a smaller effect on the coil's inductance than does the preferred silicon steel armature member at 15.

It is also possible to design an armature member to provide large hystereis losses in lieu of or in conjunction with the eddy current losses of the above-described embodiment. To achieve large hysteresis losses in the armature, both the excitation frequency and the armature material must be selected to emphasize such losses.

Figure 2:
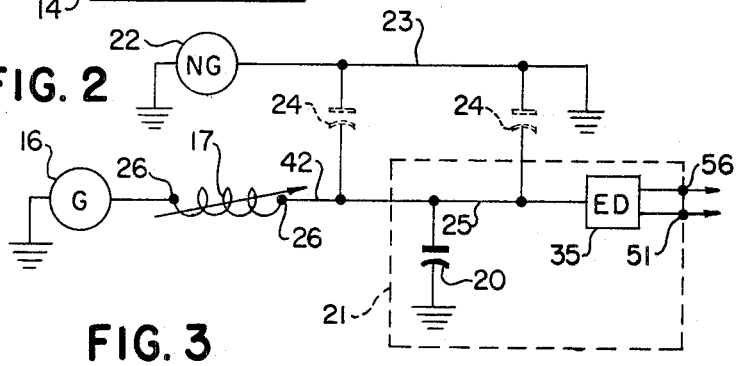
FIG. 2 in the drawings shows a functional schematic diagram of one embodiment of the present invention.

A system which incorporates use of both inductance change and energy loss change into a practical movement-sensing system is depicted in FIG, 2 of the drawings. In FIG. 2, the sensing coil 17 is shown connected to both an excitation source 16 (a source of undulating energy designated as a generator, G) and a detector means 21. In FIG. 2, the detector means is composed of a selected value capacitor 20 and an envelope detector 35; the envelope detector is labeled ED and numbered 35. A lead 25 is shown in FIG. 2 for conveying signal from the selected value capacitor 20 to the envelope detector 35; a lead 42 is shown for conveying signal between the sensing coil 17 and the selected value capacitor 20. It will be noted that distinction is made in the description between the term "detector means" and the term "envelope detector means." The former incorporates the latter plus additional components such as the selected value capacitor 20; the number "21" is used to designate the "detector means," while "35" designates the "envelope detector means."

Figure 6:
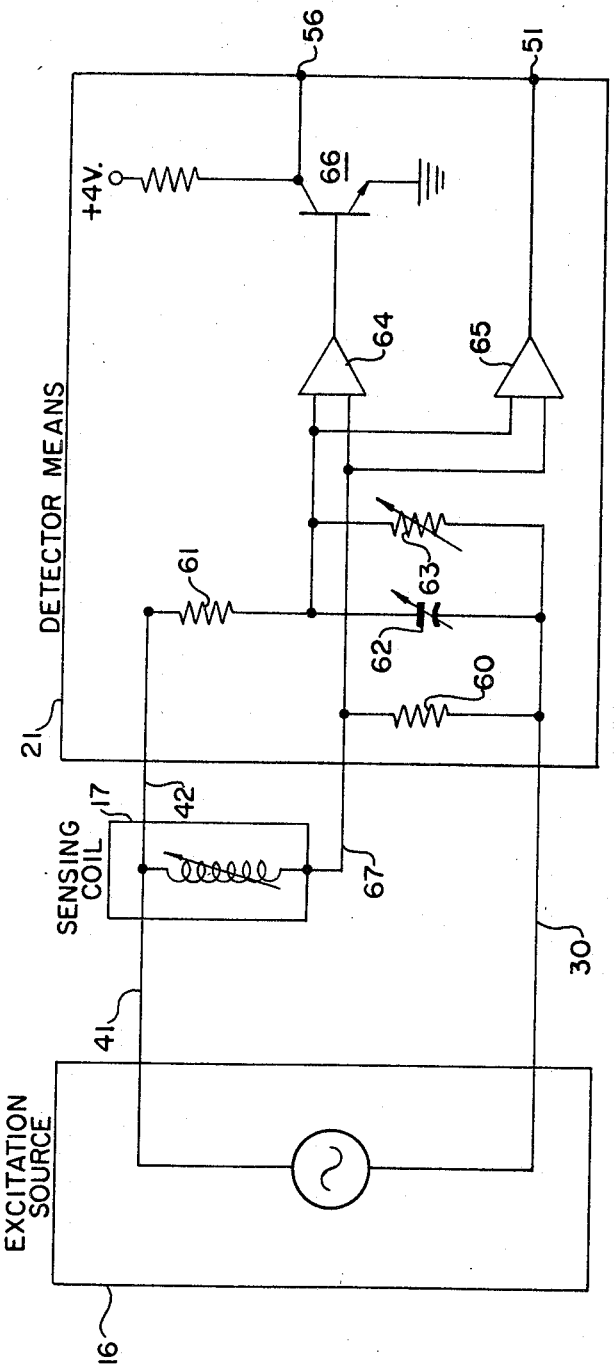
FIG. 6 in the drawings shows a schematic diagram of the present sensing system wherein a double null sensing bridge circuit is employed as detector means.

The sensing system shown in FIG. 2 employs a detector means using electrical resonance as a technique for recognizing changes in inductance and electrical losses in the sensing coil 17. Although resonance is employed to detect sensing coil 17 property changes in this embodiment of this invention, a person skilled in the art will recognize that other techniques may be employed for this sensing. (One such other technique is shown in FIG. 6 of the drawings and is described later.) The present detector means employs the resonant method of sensing and also derives, from the properties of the resonatable circuit, secondary advantages which enhance the usefulness of the sensing system. In the present detector means, the resonant circuit consists of the sensing coil 17 and the selected value capacitor 20.

In the configuration commonly employed for a high-speed punching mechanism, it is normal practice to separate the mechanical and electronic components of the system. Following this procedure, it would be common practice to locate the sensing coil 17 in FIG. 2 close to the mechanical component of the punch, while the capacitor 20 and the detector means 21 would be located remotely in the electronic area; traversing the distance between the mechanical and electronic areas may be several inches or several feet of wire. In many sensing systems, elaborate precautions are necessary to prevent external signals from being induced into this connecting wire. Especially is this true in an electromechanical device, such as a paper tape punch, where there are often large transient signals resulting from the switching on and off of current in an inductive load.

The noise conditions typically encountered in an operating environment are represented diagrammatically in FIG. 2 with the components 22, 23, and 24. In this representation, the component 22, labeled NG, represents a noise generator source, the component 23 represents leads from which noise signal may be coupled into adjacent detector circuit wiring, and the capacitors 24 represent stray capacitance between wires through which noise signals may be coupled into the detector means 21.

Capacitance coupling of noise signals into a detector circuit is most commonly observed where the detector circuit operates with a high input impedance. Under this condition, the stray capacitance and the detector's input impedance form a voltage divider network, a divider network which is inherently tailored to cause noise voltage to divide, so that the largest component appears across the detector branch with its high impedance value. Because the input element of the voltage divider network is capacitive in nature (the capacitors 24 in FIG. 2), high frequency components of the noise signal will be the component most efficiently coupled into the detector circuit.

One of the major advantages of the present detector means arises inherently from the connection of the detector circuit 21 across the capacitor 20 in FIG. 2. With the detector circuit 21 shunted by the relatively large capacitor 20, the voltage divider by which noise may be coupled into the detector circuit 21 comprises a small stray capacitance 24 in series and a large capacitance at 20 in shunt with the noise signal. The relative values of these two capacitors assure that voltage coupled into the detector circuit 21 by the noise generator 22 is quite small. Another way of viewing this condition is to realize that the coupling wires 25 and 42 are operated at a low impedance; an impedance not susceptible to capacity-induced noise. (It is known and can be mathematically demonstrated that the impedance across a high Q series resonant circuit approaches zero ohms at maximum resonance.)

Another means by which noise signals are coupled into a detector circuit, such as 21, is that of electromagnetic radiation. According to the laws of electromagnetic radiation, the signal coupled into a receiving conductor is proportional to the current flowing in the radiating member. In FIG. 2, this amounts to saying that the signal coupled into the detector connecting wiring is proportional to current flowing in the radiating wire 23; the signal coupled into the receiving wire will also be a current signal. In order that satisfactory detector circuit operation may be realized, it is necessary that this current-induced signal be impressed across some impedance which will assure that the voltage generated by it is small in relation to the desired information signal. It is apparent that, if this current-induced signal were impressed across a large impedance, a large voltage signal would result. Because the capacitor 20 in FIG. 2 offers a low impedance to signals induced by electromagnetic radiation, the sensing system shown in FIG. 2 is also relatively immune from radiated noise signals, just as it has been shown to be immune from capacity-coupled noise signals.

Several factors influence the choice of the excitation source 16 to be employed. In order that meaningful signals may be obtained from the small changes in the resonant circuit of FIG. 2, it is necessary that the oscillating frequency of the source be stable. It is also obvious that, if several sensing coils are to be employed in one mechanical system, it is desirable for the excitation source to be capable of driving a plurality of sensing coils in lieu of requiring a separate source for each sensing coil. Upon first consideration, a designer of a sensing system such as that shown in FIG. 2 would normally consider a sinusoidal oscillator or some other generator of alternating current energy for the source 16. Upon further reflection and in view of a large number of sensing circuits to be driven, the designer would realize that a sinusoidal source could only be employed at a great loss of power supply energy, since a linear but inefficient amplifier would be required. This energy loss would be especially large if a Class A amplifier were used as the output stage of the excitation source 16.

The present excitation source overcomes the disadvantages of conventional energy sources for a resonant circuit by employing a switching member as a modulator. A switching member, because of its nature of being either open or closed and spending little time in the half-open, half-closed high dissipation state, is efficient from an energy viewpoint. Since a resonant circuit acts as a wave filter, the application of square wave or switch generated energy pulses to the present sensing circuit does not affect the resonant circuit output waveform. The signal voltage observed across the capacitor 20 in FIG. 2 is approximately sinusoidal in nature, even though a sine wave energy source is not employed in the present embodiment.

The operating frequency of the excitation source 16 in FIG. 2 is selected in the present embodiment to give an energy pulse having a time duration approximating the duration of a half sinusoid for the resonant coil 17 and the capacitor 20.

In selecting the resonant frequency for the coil 17 and the capacitor 20, several factors must be considered; if a low frequency for the coil 17 and the capacitor 20 is employed, large values of capacitance and inductances are required, and the resonant efficiency or Q is low in comparison to that possible with higher frequency circuits; a low Q resonant circuit by definition affords little amplitude discrimination between two closely adjacent excitation frequencies. Related to the present sensing system, use of a low Q resonant circuit would afford difficulty in discerning the difference between extended and non-extended positions of the punch armature member.

Another consideration in selecting the resonant frequency for the coil and the capacitor in the sensing system concerns the energy losses to be expected in the armature 15 when it is excited by the sensing coil 17; energy losses in a magnetically excited member bear a positive correlation with frequency; that is, the losses increase with increasing excitation frequency. From this consideration, then, it is desirable that the resonant circuit be operated at a high frequency in order to obtain large and easily detectable changes in the losses reflected into the sensing coil 17.

Extremely high frequencies would, however, make the physical values and sizes of the sensing coil 17 and the capacitor 20 very small and difficult to manufacture to exacting tolerances. Extremely high frequencies would also increase the losses in the excitation source. It is therefore desirable, from a practical viewpoint, to select an intermediate frequency for the resonant frequency of the coil 17 and the capacitor 20.

The present embodiment of the invention has been designed to employ a resonant frequency in the neighborhood of 300 kilohertz, an inductance value for the sensing coil 17 in the neighborhood of 162 microhenrys, and a selected value capacitor 20 of 2000 picofarads. With these component values, it has been possible to sense armature motion of 0.020 inch and obtain an increase in capacitor voltage of 1½ volts when the armature 15 is moved away from the sensing coil 17.

It is significant to realize that the high transducer sensitivity realized in the present sensing system—that is, a 1½-volt resonant circuit change resulting from a mechanical motion of 0.020 inch—is the product of both sensing the inductance change in the L–C circuit composed of the sensing coil 17 and the capacitor 20 and sensing the energy loss change in the sensing coil 17.

Figure 3:
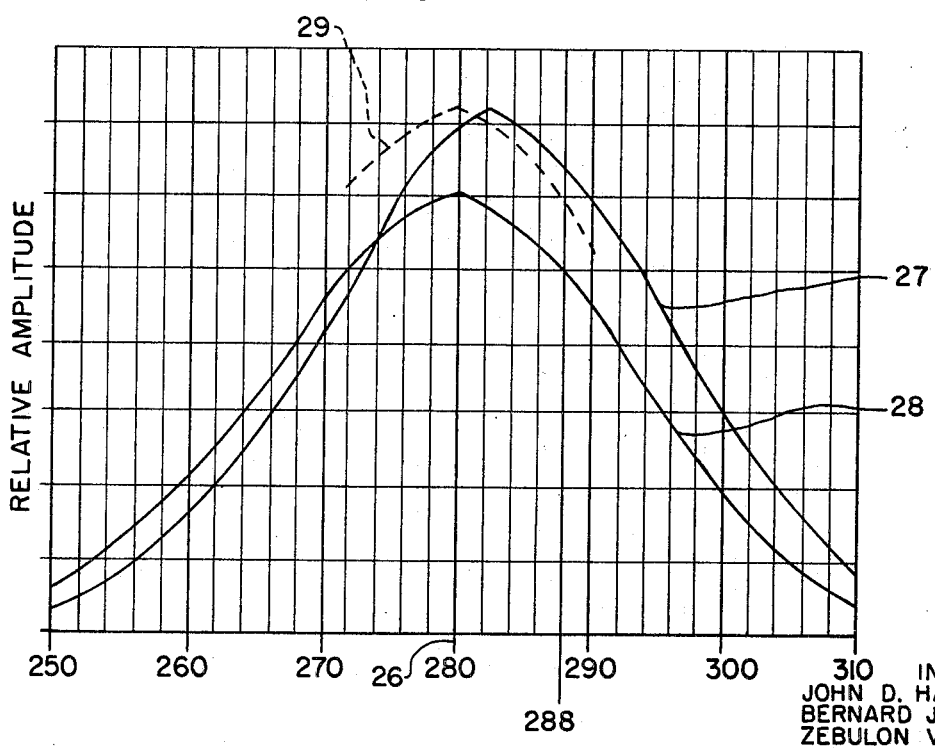
FIG. 3 in the drawings shows two bell-shaped resonant circuit response curves typical of curves obtainable from the tuned circuit of one embodiment of the present invention.

FIG. 3 in the drawings illustrates the significance of combining the effect of losses with the effect of inductance change in a verification system. In FIG. 3, the two bell-shaped curves represent amplitude of the voltage appearing across the selected value capacitor, 20 in FIG. 2, following rectification and filtering in the detector circuit. The curve 28 in FIG. 3 represents the response of the circuit when the movable armature 15 is located closest to the sensing coil 17; a separation of 0.015 inch between the armature 15 and the sensing coil's end is typical of this condition. The curve 28 may have a relative amplitude peak of 10 at an exciting frequency of 280 kilohertz.

The curve 27 in FIG. 3 represents the response of the circuit when the movable armature 15 is located remote from the sensing coil 17; a separation of 0.035 inch between the armature 15 and the end of the sensing coil 17 is typical of this condition. The curve 27 may have a relative amplitude peak of 11.3 at an exciting frequency near 283 kilohertz.

In utilizing the two curves of FIG. 3 for a verification system, it is feasible to select an operating frequency for the excitation source at any point along the horizontal axis within the extremities of the two curves. By careful examination of the curves 27 and 28, however, it is possible to select an operating frequency which yields a maximum relative amplitude difference between the remote and close positions of the armature 15 (a maximum vertical distance between the two curves). By experience, it is found that an operating frequency along the right-most skirts of the two curves is desirable from this maximum voltage difference viewpoint; the operating frequency of 288 kilohertz shown in FIG. 3 represents a desirable point along the right-most skirts for the two curves shown in FIG. 3.

As a practical matter in designing a verification system according to this invention, it may be desirable to select a whole number frequency, such as 300 kilohertz, for the excitation source 16, then select an inductance value for the sensing coil 17 to yield resonance in approximately the 300 kilohertz region, and then perform the exact positioning of the curves 27 and 28 with respect to the operating frequency by selection of the value of the capacitor 20. The exact procedure to be employed is a matter of design choice.

The significance of combining the effects of inductance change and coil loss change in an additive manner in the verification system is apparent from examining the curves in FIG. 3. Without the coil loss change component, the curves 27 and 28 would have equal peak amplitudes, and the difference signal obtainable from the remote and close positions of the armature member would be much smaller than now possible (with the loss component). The dotted curve 29 in FIG. 3 represents this condition. The dotted curve 29 is obtained by raising the curve 28 until it has an amplitude peak equal to that of the curve 27. In this condition, the skirt of the dotted curve 29 and the curve 27 can be seen to be very close in vertical position.

Only by increasing the horizontal distance between the peak of the dotted curve 29 and the peak of the curve 27 in FIG. 3 or by increasing the slopes of the curves could the distance between the skirt of the dotted curve 29 and the skirt of the curve 27 be increased. Since the first of these options implies that a larger change in coil inductance or greater armature movement would be required, and the second implies that a more efficient resonant circuit is required, neither option is desirable from a practical viewpoint. Use of the coil loss component in the sensing system of this invention precludes the need for either of these undesirable options.

Earlier in this specification, the use of a non-magnetic armature at 15 was mentioned; it was noted at that time that such a non-magnetic armature is capable of producing both a change in sensing and inductance and a change in sensing coil energy losses, just like the magnetic armature, although with some lesser amount of signal being developed. In view of the preceding discussion of FIG. 3, the properties of the sensing coil when coupled to a non-magnetic armature are disclosed here.

When a non-magnetic armature 15 is coupled with the sensing coil, movement of the armature into a position closer to the sensing coil produces an increase in sensing coil energy losses, since energy is dissipated in the bulk resistance of the armature member. In addition to this change of losses, movement of the armature close to the sensing coil also decreases the sensing coil inductance, since the armature appears as a shorted turn to the sensing coil. As with the previous embodiment, it is desirable that this change of inductance be sensed in a manner which is harmonious with sensing the change in losses induced into the sensing coil. In the non-magnetic armature embodiment, it is desirable for the decrease in inductance and the increase in losses to produce cooperative effects in the detector circuitry; this may be accomplished in the resonant circuit detector by realizing that the low inductance, high loss conditions occur simultaneously, so that the low amplitude curve will lie on the high frequency side of the high amplitude curve in lieu of their reversed relation, as shown in FIG. 3.

Because of this reversed relation between the low and high amplitude response curves with a non-magnetic armature, the modulating frequency of the excitation source is most advantageously placed along the left-hand skirts of the curves when a non-magnetic armature is employed, in lieu of the right-hand skirt placement indicated for FIG. 3.

Cooperation between the change in sensing coil inductance and the change in sensing coil losses may also be maintained when the later-to-be-described alternating current bridge circuit is employed in the detector means; with the bridge circuit detector embodiment, the increase in losses and the decrease in inductance as the non-magnetic armature moves toward the sensing coil must both drive the bridge circuit away from balanced or null condition.

Figure 4:
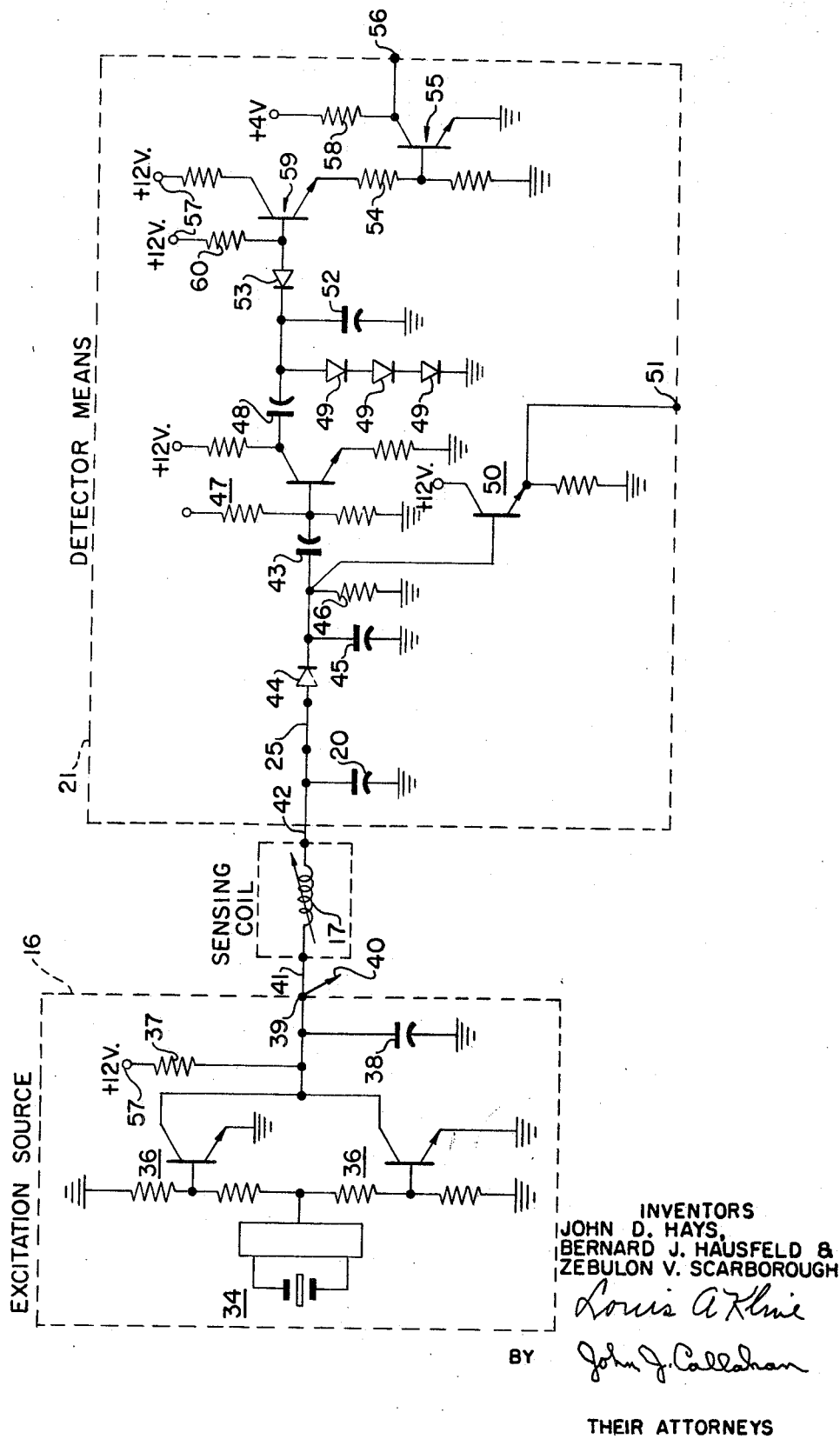
FIG. 4 in the drawings shows a schematic diagram of the excitation source, sensing coil sensor, and detector means of the preferred embodiment of the present invention.

FIG. 4 of the drawings represents one actual circuitry embodiment which may be used in realizing the three elements of the sensing system shown in FIGS. 5 and 2. In FIG. 4, there are shown an excitation source 16 and a lead 41 connecting the excitation source 16 to the sensing coil 17, a lead 42 connecting the sensing coil 17 to the detector means and the selected value capacitor 20, and a lead 25, corresponding to the lead 25 in FIG. 2, connecting the selected value capacitor 20 to the envelope detector circuit. In FIG. 4, the envelope detector which is identified by the numeral 35 in FIG. 2 comprises all of the detector means components with the exception of the selected value capacitor 20. In keeping with the spirit of the present invention, the leads 41, 42, and 25 in FIG. 4 are shown as non-shielded wires. The need for shielding or other noise protection for these wires is eliminated by the noise rejection ability inherent in the sensing system.

In FIG. 4, the components inside the box identified as 16 represent one embodiment of an excitation source usable with the resonant circuit version of the movement verification system. The circuitry inside the box 16 in FIG. 4 consists of a piezo electric crystal controlled oscillator 34, driving a pair of parallel-connected transistor switching stages 36. In this circuit, the piezo electric crystal controls the rate at which the switching transistors open and close. The exact circuitry employed in fabricating the crystal-controlled oscillator 34 may be taken from the prior art concerned with solid state crystal-controlled oscillators; an example of such circuitry is given in the transistor manual published by General Electric Company, seventh edition, page 211.

In operating the excitation source 16 in FIG. 4, energy from the +12-volt supply is applied to the circuit at the terminal 57. The resistor 37 functions as a current source and limits the current flowing from the terminal 57 into the sensing coil via the terminal 39 and the lead 41. The switching transistors 36 serve to modulate the current flowing from the terminal 57. These transistors interrupt the exciting current flowing into the sensing coil when they are in the "on" state.

FIG. 4 shows a single sensing system connected to the excitation source output terminal 39, even though in a practical system it is desirable for the excitation source 16 to be capable of driving several such sensing systems. Connection of the excitation source to these additional sensing systems is indicated by the lead 40. To prevent signals from one sensing system which is connected to the terminal 39 from interfering with or becoming part of the signals found in another sensing system, the capacitor 38 within the excitation source is utilized. The capacitor 38 restricts the voltage excursions observable at the excitation source terminal during the interval when the switching transistors are in their "off" state. A person skilled in the electronic art will realize that the capacitor 38 may be omitted if the excitation source's output stage is designed around a complementary switching circuit which alternately connects the output terminal to a power source and to ground. Either the capacitor 38 or such a conducting switch may be used to return the terminal 39 to signal ground and prevent intercoupling of signals.

In FIG. 4, the sensing coil 17 and the selected value capacitor 20 are shown connected into a circuit which has the capability of being tuned to resonance. The lead 25, which may be relatively long, is used to connect the envelope detector to the selected value capacitor 20.

The envelope detector circuit in FIG. 4 comprises one embodiment of a circuit capable of demodulating the A.C. voltage appearing across the selected value capacitor 20 and then comparing this voltage with a standard or predetermined value and indicating when the capacitor voltage exceeds the predetermined value. The essential properties of the detector means 21 are that it present a relatively high impedance load to the resonatable circuit comprising the sensing coil 17 and the capacitor 20, and that it have a stable comparison means and that, in addition, it should be capable of supplying an output signal compatible with the electronics used in the remainder of the machine system.

In the illustrated detector circuit embodiment, the diode 44 and the capacitor 45 are used to rectify and store the peak positive value of the voltage appearing across the selected value capacitor 20. During the first few cycles of oscillation at a given amplitude, the diode 44 causes energy from the selected value capacitor 20, to be coupled into the capacitor 45; once the voltage across the capacitor 45 attains the peak value of voltage appearing across the capacitor 20, conduction in the diode 44 ceases. The action of the diode 44 and the capacitor 45 may be considered as an envelope detector operating in a fashion similar to the detector in an amplitude-modulated radio receiver. The resistor 46 in the detector circuit provides a path for discharging the capacitor 45. This discharge is necessary in order that the envelope detector output be capable of following or complying with decreases in the voltage appearing across the selected value capacitor 20.

At 50 in the detector means block 21, an emitter follower circuit is shown. This circuit is used to couple the detected sensor voltage to an external load. The detector output at the terminal 51 may be utilized when the present sensing system is to be employed as an analog transducer of mechanical motion into an electrical signal, an analog transducer system being one which gives a continuous function representation of the moving member rather than a step function or binary representation. An analog transducer system is useful in engineering studies of high-speed mechanical motions such as those taking place in a paper tape punch. An analog transducer system may also be utilized for maintenance purposes for quantitative examining of machine motion. Velocity and acceleration information for the moving member may also be obtained from the signal at the terminal 51 by means of electronic processing of the analog position signal or by mathematical calculations performed on the analog data.

At 43 in the detector means 21, a capacitor is used to couple the detected signal into an amplifier circuit 47. This amplifier provides an increase in detected signal voltage level as well as isolates the detector circuit from loading by later circuitry. The output of the amplifier circuit 47 is coupled through a capacitor 48 into a voltage comparison network. In the voltage comparison network, the transistors 59 and 55 are held in the conducting state by current flowing from the terminal 57 of the +12-volt source through the resistance 60. When a signal of sufficient negative amplitude is coupled through the capacitor 48, the transistor 55 is switched to the "off" state, whereupon the resistor 58 raises the output terminal 56 toward +4 volts and couples a signal into the logic circuitry controlling the vertified moving member (15 in FIG. 1). Signals which are not of sufficient amplitude to switch the transistor 55 to the "off" state are ignored by the detector means. The base-to-emitter voltage drop in the transistors 55 and 59, the diode array 49, the diode 53, and the resistor 54 are effective to determine the switching point or threshold point of the circuit. The capacitor 52 in the detector means is used to provide an output signal duration time sufficient to activate other circuitry in the control logic.

FIG. 6 in the drawings shows another embodiment of the detector means 21. In this embodiment, the sensing coil is one arm of an alternating current bridge circuit rather than a part of a resonant circuit, as was true in the previous detector means embodiment.

FIG. 6 shows the vertification system to consist of the three essential elements already described with relation to FIG. 5; namely, an excitation source, a sensing coil, and a detector means. The FIG. 6 embodiment of the invention also utilizes the same two components of sensing coil property change as the FIG. 4 embodiment; the properties of coil loss change and coil inductance change resulting from a metallic member's moving between close and remote positions in the sensing coil's magnetic field.

The excitation source 16 in FIG. 6 may be embodied by a transistor oscillator such as the crystal oscillator suggested for FIG. 4. An amplifier having a transformer coupled output stage may be employed to isolate the oscillator from the load variations imposed by the bridge circuit. One amplifier which may be modified to perform this service is shown on page 356 of the publication "Transistor Manual, Series SC–11," of Radio Corporation of America; this amplifier, when modified to pass frequencies in the low radio frequency range, provides an A.C. source suitable for driving the bridge circuit.

The detector means shown in FIG. 6 employs one of the commonly used alternating current bridge circuits. In this circuit, resistive elements 60 and 61 form two of the bridge arms, while the sensing coil 17 and the capacitor-resistor combinations 62 and 63 form the other two arms. A person skilled in the electronic art will recognize that this is but one of many alternating current bridge circuits which may be employed to sense variations in both the inductance and the loss properties of a coil.

Regardless of the bridge circuitry employed, alternating current bridges are possessed of the feature that two separate conditions must be met for achieving a bridge null or balance condition; both the reactive and the resistive components of the unknown element must be balanced. This requirement leads to the commonly accepted statement that an alternating current bridge circuit has two null points—one resistive and one reactive. In the application of a bridge circuit to the verification system, the reactive measuring capability or the reactance null of the alternating current bridge is used to sense inductance variations in the sensing coil, while the resistance-measuring capability, or the resistance null, senses the variations in sensing coil losses. In the circuitry of FIG. 6, the adjustable capacitance 62 permits accomplishment of bridge balance for reactance, while the adjustable resistance 63 provides for bridge balance for resistance. A discussion of the alternating current bridge and its double null properties is given in General Radio Company's Catalog "T," February, 1968, at page 66. This discussion is helpful in applying bridge techniques to the present vertification system.

In adapting a bridge circuit to perform the requirements of the detector means in the present invention, it is important that cooperative addition be maintained between the effects of sensing coil loss change and sensing coil inductance change. As was true in the resonant circuit detector embodiment of FIG. 4, these two properties are separate and distinct and may have their effects combined either in a helpful and aiding manner or in a conflicting and opposing manner. In applying this concept, where the detector means utilizes a bridge circuit, it is necessary to insure that the inductance change and the loss change produced by a unidirectional movement of the sensed mechanical member (15 in FIG. 1) produce the same effect on the bridge circuit; that is, both changes drive the bridge toward a null condition or away from a null condition. In practice, this condition may be realized by adjusting the bridge for both a reactance and a resistance null while the sensed movable member is in a maximum displaced position; in this condition, movement of the sensed member toward the minimum displaced position will compromise both the reactance null and the resistance null.

Causing the bridge circuit to be nulled while the mechanical member is in maximum displaced position also has the effect of producing decreasing signal output from the null amplifier 64 in FIG. 6 as the sensed mechanical member (15 in FIG. 1) moves toward the maximum displaced position. The transistor 66 in FIG. 6 is biased to undergo a change of state when impressed with a low value of null amplifier output. In this fashion, the output of the detector means at 56 is a digital signal which changes state when the maximum displaced condition is approached by the moving mechanical member.

The amplifier 65 in FIG. 6 provides means for coupling an analog signal representing displacement of the moving member to an external load. Both the amplifier 65 and the amplifier 64 are of the differential input high input impedance type which avoid heavy loading on the bridge circuit and the resulting disturbance of balance conditions therein. An amplifier similar to the integrated circuit amplifier SN526 manufactured by Texas Instruments, Incorporated, provides characteristics suitable for use at either the position 64 or 65 in FIG. 6.

As indicated previously, other bridge circuits, in addition to the one of FIG. 6, may be employed in the detector means of the verification system. In contrast to the capacitance-inductance bridge of FIG. 6, a bridge which employs an inductive element in an arm adjacent to the sensing coil 17 exhibits smaller sensitivity to frequency change in the excitation source, since both the standard and the unknown reactances vary in direct proportion to the excitation frequency, while, with the bridge shown in FIG. 6, one reactance varies directly with frequency, and the other varies inversely with frequency.

The frequency sensitivity of the bridge circuit of FIG. 6 also precludes use of a switching mode square wave excitation source (at 16 in FIG. 6), as was possible with the resonant circuit embodiment of the detector means shown in FIG. 4. The high harmonic content of the waveform derived from a switching circuit prevents a single null point from being reached for the reactive elements of the bridge of FIG. 6, since each sinusoidal component of the square wave requires a different value of inductance and capacitance to achieve bridge balance. For the bridge circuit shown as the embodiment of the detector means in FIG. 6, an excitation source providing a nearly pure sinusoidal waveform is required. The oscillator and amplifier combination described earlier is capable of furnishing this waveform.

In both the resonant circuit and bridge circuit embodiments of a detector means 21, it is possible to relate the reactance value of the detector means reactive component (the selected value component) to the reactance value of the sensing coil. In the resonant circuit detector means, the selected value component operating with the sensing coil is the capacitor which tunes the sensing coil to resonance; in this detector means embodiment, the reactances of the sensing coil and the selected value capacitor are related one to one; that is, they are equal. In the alternating current bridge circuit embodiment of the detector means, one-to-one correspondence between sensing coil and detector means reactances may also be applicable; that is, the inductive reactance of the sensing coil may equal the selected value component reactance in the bridge circuit. In the bridge circuit detector means, the corresponding reactance may be either inductive or capacitive in nature, depending upon the bridge configuration employed. In the bridge circuit detector means, it is also possible to have the sensing coil reactance and the bridge's capacitive or inductive reactance related in magnitude by some factor other than one; for example, the bridge's reactance may be twice that of the sensing coil's and yet achieve bridge nulling. This latter condition is acceptable to the bridge if the resistance ratio arms of the bridge are correspondingly related.

Regardless of the ratio between sensing coil reactance and detector circuit reactance and the form of detector circuit used, it is clear that the two reactances must bear some precise relation in amplitude; that is, they must complement each other or cancel the effects of each other in the circuitry employed.

A better comprehension of the present invention may be had from comparing its characteristics with those of some prior-art verification systems. The most significant of these comparisons are outlined in the following paragraphs.

Some prior-art verification systems do not distinguish between the moving member's departing from home position and its attaining fully extended position. In a high-speed punch mechanism, for instance, these prior-art systems issue a verifying signal if the punching pin departs from its static position, regardless of whether or not the pin attains fully extended status, wherein it pierces the media tape.

It is understandable that the absence of fully extended position verification can lead to undesirable consequences, since the movable member may successfully depart from its static position but be prevented from reaching fully extended position by friction or binding in the mechanism. This possibility is especially prevalent with impact-driven equipment. The present verification system easily overcomes the difficulty of sensing only departed-from-home condition; the present system may be adjusted in the detector circuitry to register an output signal only when the mechanical member has reached its fully extended position. The discussed embodiments of the present system are capable of detecting the last five percent of pin travel and presenting output signal only when the moving machine member has reached this last five percent of travel.

Another notable feature of the present verification system is its freedom from the use of magnetized members in either the sensing coil or the movable machine member; this absence of magnetized members imparts a freedom from large physical sizes and sensitivity to vibration which are commonly associated with permanent magnets. In addition to the absence of large permanent magnets, the sensing coil of the present invention may also be small, so that it fits into a restricted physical space not needed for the mechanism itself. It is also true that either or both of the sensing coil and the lossy, magnetic member which couples with it may be made movable in the present system, so long as electrical connections may be made to the sensing coil.

The present sensing system, because of its ability to present an analog output signal, may be used in engineering studies of a high-speed moving member. In this application, data representing instantaneous position can be obtained from the output terminal of the sensing system, and this data may be operated upon manually or electronically to obtain velocity and acceleration information.

In contrast to many prior-art sensing systems, the present invention does not require the use of square loop or ferrite magnetic members. Both the mechanical fragility and the temperature sensitivity of these ferrite members would be a detraction from the properties of the present sensing system. The absence of square loop magnetic material from the present system is also important in providing an analog output signal, since square loop or non-linear transducer properties would preclude an output having infinite resolution of the mechanical moving member.

The ability of one embodiment of the present verification system to accept excitation from a square wave energy source enables a saving in energy as well as a reduction in component sizes within the excitation source. The high efficiency switching mode excitation source eliminates the necessity for large power transistors and heat sinking capability. The transistors 36 in the excitation means of FIG. 4 may be of the small TO–5 size package; such transistors as the 2N2270 may be readily used in this service.

The inherent freedom of one embodiment of the present verification system from radiated or coupled electrical noise is a significant advantage in packaging the system. With the present system, it is unnecessary to restrict the detector to the immediate vicinity of the moving mechanical member. It is also unnecessary to use shielded wire or to employ undue physical separation between high energy and low energy leads in order that noise signals may be excluded from the verification system.

The ability of the present system to provide indication of static position between the two machine members is also an improvement over the prior art. Verification systems which employ a permanent magnet or are dependent on mechanical motion to produce a changing magnetic field cannot convey information about stationary relations between the parts. The present system is useful over a velocity range down to zero relative motion.

The present verification system may be applied to a variety of machines having moving parts; it is also possible to apply the invention to other computer peripheral devices in addition to paper tape punches, such as high-speed printers, card punches, and sorting devices.

Typical values for those areas of the present verification system shown in FIG. 4 which are critical to the operation of the systems are listed below. The resistor 37 is 40 ohms at 3 watts, the capacitor 38 is 0.082 microfarad, the coil 17 is approximately 162 microhenrys and wound with AWG #44 wire, the capacitor 20 is 2000 picofarads, the capacitor 45 is 0.01 microfarad, the resistor 46 is 100 kilo ohms, the capacitor 43 is 4.7 microfarads, the capacitor 48 is 39 microfarads, the capacitor 52 is 0.01 microfarad, and spacing between the sensing coil and the armature is 0.015 to 0.020 inch in the close position and 0.035 to 0.040 inch in the remote position.

Typical values for critical components of the verification system embodiment shown in FIG. 6 are as follows: the sensing coil 17, approximately 162 microhenrys; the resistor 60, 300 ohms; the resistor 61, 300 ohms; and the capacitor 62, 1700 picofarads. The value of the resistor 63 depends on the inherent and induced resistive components in the sensing coil 17.

Some changes may be made in the construction and arrangement of the verification system of this invention without departing from the spirit and the purpose thereof; the descriptions which have been given are by way of example only, and the following claims are intended to cover modified forms or equivalents which reasonably fall within this scope.

What is claimed is:

1. Apparatus for sensing realtive movement between a first member and a second member of a machine, said apparatus comprising:
   a sensing coil mounted upon said first machine member adjacent to said second machine member,
   said sensing coil and said second machine member being magnetically coupled in a manner which is both close and variable in response to relative movement between said first and second machine members,
   said second machine member being either electrically conductive or of differing magnetic permeability with respect to air, so as to change the inductance of said sensing coil when located adjacent thereto,
   said second machine member also being dissipative of energy induced therein by modulated magnetic excitation, thereby endowing said sensing coil with alternating current resistance which is variable according to the degree of coupling between said sensing coil and said second machine member;
   a modulated source of energy coupled with said sensing coil,
   said energy source having an output waveform composed of one or more component waveforms, at least one of which is an alternating current waveform,
   said energy source being effective to make detectable in said sensing coil said variation in alternating current resistance and said variation in inductance; and
   detector means coupled with said sensing coil and said energy source,
   said detector means including means for detecting said variations in sensing coil alternating current resistance and inductance,
   said detector means also including means for generating a signal representative of instantaneous composite value of said alternating current resistance and inductance,
   said signal representative of instantaneous alternating current resistance and inductance being also representative of instantaneous position between said first and second machine members.

2. Apparatus for sensing relative movement as in claim 1 above wherein said detector means also includes means for coupling said signal representative of instantaneous values to external utilization means.

3. Apparatus for sensing relative movement as in claim 1 above wherein said detector means also includes means for determining that a predetermined value of said signal representative of instantaneous position has been attained, and issuing an indication thereof to external utilization means.

4. Apparatus for sensing relative movement as in claim 1 above wherein said apparatus includes both means for coupling said signal representative of instantaneous values to external utilization means, and means for determining that a predetermined value of said signal representative of instantaneous position has been attained and issuing an indication thereof to external utilization means.

5. Apparatus as in claim 1 above wherein said means for detecting variations in sensing coil alternating current resistance and inductance includes circuit means utilizing a selected value reactive component,
   said selected value reactive component having an electrical value which, upon excitation at a selected operating frequency and during an extreme displacement of said first and second machine members, precisely complements in said detector circuit the reactance value obtained from exciting the inductance of said sensing coil at said frequency.

6. Apparatus as in claim 5 above wherein said circuit means utilizing a selected value reactive component is a bridge circuit,
   said bridge circuit, in addition to containing said reactive component, also containing a resistive component, said reactive and resistive components being usable respectively in obtaining a reactive null point and a resistive null point in said bridge circuit.

7. Apparatus as in claim 5 above wherein said circuitry utilizing a selected value reactive component is a resonatable tuned circuit,
   said resonatable tuned circuit comprising said sensing coil and a selected value reactive component which is a capacitor means,
   with the reactance value obtained from exciting said sensing coil's inductance and the reactance value obtained from exciting said selected value capacitor means being of equal magnitude during maximum displacement of said first and second machine members and during excitation at a selected frequency.

8. Apparatus for sensing relative movement between a first member and a second member of a machine, said apparatus comprising,
   a sensing coil movable in conjunction with said first machine member;
   a metallic portion movable in conjunction with said second machine member;
   said sensing coil and said metallic portion being magnetically coupled in a manner which is both close and variable in response to relative motion between said first and second machine members;
   said sensing coil being tunable by a selected value capacitance means to form a resonant circuit, with said resonance being adjusted to a maximum degree during an extreme position of said first and second machine members,
   said resonant circuit being detunable away from said maximum resonance upon relative movement of said first and second machine members away from said extreme position and by reason of a magnetically-induced change in two or more electrical properties of said sensing coil;
   a detector means incorporating said selected value capacitor,
   said detector means comprising means for sensing the degree of resonance occurring in said resonatable circuit,
   means for coupling to utilization means a signal representing the degree of resonance occurring in said resonatable circuit, and
   means for issuing an indication that a predetermined value of resonance is occurring in said resonatable circuit,
   said means for sensing the degree of resonance being coupled by leads to said sensing coil and said selected value capacitor, said coupling being accomplished at a point in said sensing coil-selected value capacitor circuit which provides electrical impedance relatively immune to noise signals coupled into said leads; and
   a modulated, frequency stable excitation means capable of exciting said sensing means.

9. Apparatus for sensing relative movement as set forth in claim 8 wherein said point which provides electrical impedance relatively immune to noise signals is a point directly shunted by said selected value capacitor so that
said coupling leads are shunted by a capacitance having low impedance with respect to transient noise signals, and
said sensor and detector are relatively immune to said noise coupled into said leads by means of capacitance between an electrical noise source and said leads.

10. Apparatus for sensing relative movement as set forth in claim 8 wherein said point which provides electrical impedance relatively immune to noise signals is a high signal level point in said circuit, so that
said sensor and detector means are relatively immune to magnetically radiated noise coupled into said leads.

11. A movement-sensing system which is one of a plurality of such systems for transducing reciprocal motion between first members and second members of a machine into an electrical signal, said sensing system comprising in combination:
a sensing coil member mounted on each of said first machine members;
a magnetic member mounted on or constituting part of each of said second machine members, said magnetic member being closely magnetically coupled with said sensing coil and being composed of material displaying large-energy losses in the kilohertz range of magnetic excitation;
a capacitor member of selected value, said capacitor being electrically connected with said sensing coil member and having an electrical value which will tune said sensing coil to maximum resonance at a first frequency when said first and second machine members are maximally displaced;
said sensing coil and selected value capacitor being tunable to resonance at a second frequency when said first machine member and said second machine member become minimally displaced;
said resonance at said first frequency and said resonance at said second frequency being of different amplitude by reason of differing magnetic energy losses from said sensing coil when said machine members are maximally and minimally displaced;
said sensing coil and selected value capacitor being tunable to resonance at a second frequency when said first machine member and said second machine member become minimally displaced;
said resonance at said first frequency and said resonance at said second frequency being of different amplitude by reason of differing magnetic energy losses from said sensing coil when said machine members are maximally and minimally displaced;
detector means incorporating said selected value capacitor member, said detector means comprising means for developing an output signal upon sensing across said capacitor a signal of predetermined amplitude;
said detector means also comprising means for envelope detecting, filtering, and coupling to external utilization means, signal developed across said selected value capacitor; and
an excitation source having a modulating switch device operable in the low radio frequency range, said modulating switch operating at a frequency within or slightly outside the interval of frequencies between said first frequency and said second frequency;
said modulating switch operating frequency being a frequency causing a large and distinguishable amplitude difference in said signal sensed across said selected value capacitor upon said first and second machine members changing from minimum to maximum displaced position, whereby said amplitude difference in signal sensed across said selected value capacitor arises by reason of inductance change and resonant circuit efficiency change upon changing said first and second machine members from minimum to maximum displaced positions, and
said movement-sensing system is inherently relatively free from influence by nearby electrical noise sources.

12. A verification system for a media-perforating machine having movable punching members reciprocating between a non-extended position and an extended position, said verification system comprising in combination:
a plurality of ferro-magnetic armatures each mounted to be movable in conjunction with one of said punching members,
said ferro-magnetic armatures being composed of solid cast silicon steel or an equivalent material;
a plurality of ferro-magnetic armatures each mounted to with respect to said ferro-magnetic armatures,
said sensing coils being magnetically coupled with said ferro-magnetic armatures in a manner which is both close and variable in response to motion of said punching members,
said sensing coils being of small configuration and having an air core,
said sensing coils each having an inductance value which is variable in response to changes in magnetic coupling between said coils and said ferro-magnetic armatures,
said inductance value for each sensing coil assuming a large value when said sensing coil and said ferromagnetic armature are minimally displaced and assuming a smaller value when said sensing coil and said magnetic armature are maximally displaced,
said sensing coils also each having electrical losses which are variable in response to changes in magnetic coupling between said coils and said ferro-magnetic armatures,
with said electrical loss property in each sensing coil assuming a large value when said sensing coil and said magnetic portions are minimally displaced and assuming a smaller value when said sensing coil and said magnetic portion are maximally displaced;
a plurality of selected value capacitors each connected in series with one of said sensing coils,
each of said selected value capacitors having an electrical value which will cause said sensing coil to be tuned to resonance when said sensing coil's magnetic armature is minimally displaced with respect to said sensing coil,
said resonance occurring at a frequency called a first frequency,
said resonance being the peak amplitude point in a first bell-shaped curve relating voltage amplitude and excitation frequency for said sensing coil-selected value capacitor circuit,
said first curve being therefore identified with minimal displacement of said armature,
said capacitor value also being a value which will cause said sensing coil to be tuned to maximum resonance when said sensing coil's magnetic armature is maximally displaced with respect to said sensing coil,
said maximum resonance occurring at a frequency called a second frequency,
said maximum resonance being the peak amplitude point in a second bell-shaped curve relating voltage amplitude and excitation frequency for said sensing coil-selected value capacitor circuit,
said second bell-shaped curve being therefore identified with maximal displacement of said armature,
said maximum resonance at said second frequency being greater in amplitude than said resonance at said first frequency by reason of a decreased quantity of said electrical losses being induced into said sensing coil when said magnetic armature member is maximally displaced from said sensing coil as compared to when said magnetic armature member is minimally displaced from said sensing coil;

an on-off, switch-modulated excitation source, said excitation source being electrically connected to a plurality of said sensing coils so as to excite said coils, said excitation source having its modulating frequency precisely controlled by a piezoelectric crystal at a modulating frequency called a third frequency, said third frequency being a frequency slightly higher than said first and second frequencies, said third frequency being selected as an excitation frequency which will produce a large and approximately maximum amplitude difference between said first bell-shaped curve and said second bell-shaped curve, said third frequency being a frequency indicative of an operating point along a right-hand or high frequency skirt of said first and second bell-shaped curves;

a plurality of detector means, each incorporating one of said selected value capacitors, said detector means also each including means capable of envelope detecting and filtering said voltage appearing across said selected value capacitor and converting said signal into a signal representing instantaneous position of said armature members, said detector means also each including means capable of comparing to a predetermined reference said envelope detected filtered and converted signal, said detector means also each comprising means for signalling to a receiving means upon said envelope detected and filtered signal attaining a value equal to said predetermined reference; and a plurality of leads, said leads comprising means for connecting each sensing coil with said excitation source and connecting each sensing coil with said selected value capacitors and connecting each sensing coil-selected value capacitor combination with said envelope detecting and filtering means, said leads being of sufficient length to permit remote physical location of said components with respect to each other, said leads being routable through regions of relatively high electrical noise while maintaining relatively high immunity to electrical noise signals generated therein, said leads achieving said noise immunity by reason of the selective filtering action of said tuned sensing coil-selected value capacitor circuit, said leads also achieving said noise immunity by reason of the high capacitance shunting action of said selected value capacitor upon the members of said leads connecting said detectors to said selected value capacitors; whereby said noise-immune, switch-modulator-excited verification system is capable of generating signals representing full extension or intermediate extension of said punching member.

13. In a movement-sensing system comprising a plurality of inductive sensing devices having a common excitable terminal, means for exciting said plurality of sensing devices comprising: a source of direct current energy;

an electronic switching means so connected as to interrupt energy flow betwen said direct current energy source and said common excitable terminal;

frequency control means capable of opening and closing said electronic switching means in rapid and precisely timed intervals; and means for preventing intercoupling between said plurality of inductive sensing devices via said common excitable terminal during any operating phase of said electronic switching means.

14. The exciting means as in claim 13 wherein said means for preventing intercoupling comprises a capacitor means.

15. The exciting means as in claim 13 wherein said means for preventing intercoupling comprises a second electronic switching means.

References Cited

UNITED STATES PATENTS

| | | | |
|---|---|---|---|
| 2,293,708 | 8/1942 | Brown. | |
| 2,609,433 | 9/1952 | Goff | 234—33 X |
| 3,159,337 | 12/1964 | MacNeill et al. | 234—33 |
| 3,245,615 | 4/1966 | Heymann | 234—33 |
| 3,430,529 | 3/1969 | McMonagle | 234—33 |

WILLIAM S. LAWSON, Primary Examiner

UNITED STATES PATENT OFFICE
CERTIFICATE OF CORRECTION

Patent No. 3,512,704  
May 19, 1970

John D. Hays et al.

It is certified that error appears in the above identified patent and that said Letters Patent are hereby corrected as shown below:

Column 3, line 23, after "cations" insert -- where --. Column 18, line 17, "ferro-magnetic armatures each mounted to" should read -- sensing coils each stationarily mounted --.

Signed and sealed this 29th day of December 1970.

(SEAL)  
Attest:

Edward M. Fletcher, Jr.  
Attesting Officer

WILLIAM E. SCHUYLER, JR.  
Commissioner of Patents